Figure 1:
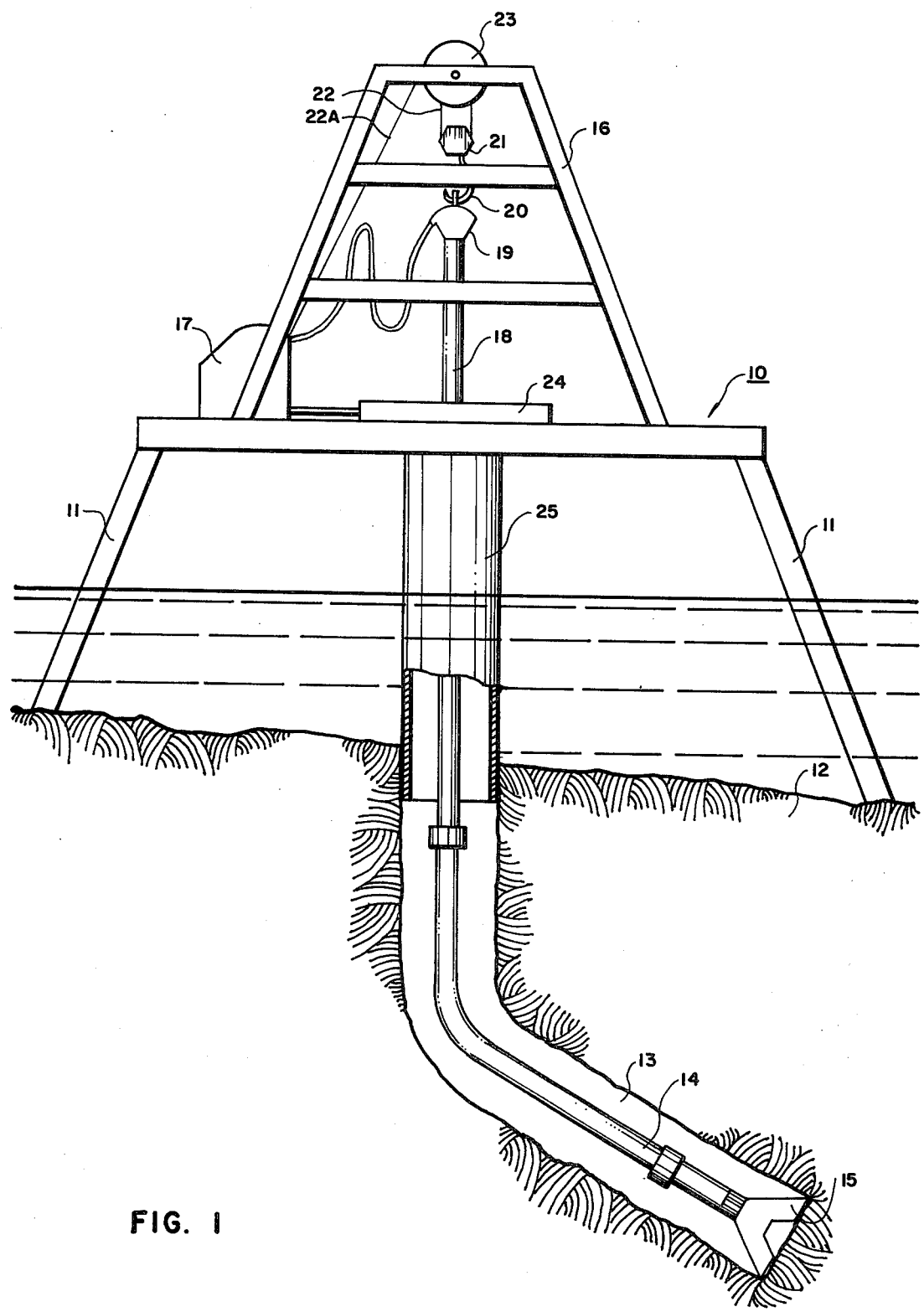

United States Patent [19]

Marquis

[11] 4,171,031

[45] Oct. 16, 1979

[54] WELL LOGGING INSTRUMENT GUIDE APPARATUS

[75] Inventor: Gerald L. Marquis, London, England

[73] Assignee: Dresser Industries, Inc., Dallas, Tex.

[21] Appl. No.: 838,681

[22] Filed: Oct. 3, 1977

[51] Int. Cl.² .......................... G01V 1/40; E21B 17/10
[52] U.S. Cl. .................................... 181/102; 166/241; 308/4 A
[58] Field of Search ........................ 181/102; 166/241; 308/4 A; 33/304, 313; 73/151

[56] References Cited

U.S. PATENT DOCUMENTS

| | | | |
|---|---|---|---|
| 1,555,918 | 10/1925 | Friesen | 166/241 |
| 2,931,440 | 4/1960 | LeBourg | 308/4 A |
| 3,572,432 | 3/1971 | Aulick | 166/241 |
| 3,613,783 | 10/1971 | Seabourn | 166/241 |
| 3,978,924 | 9/1976 | Roesner | 166/241 |
| 3,982,606 | 9/1976 | Berry et al. | 181/102 |
| 3,991,850 | 11/1976 | Escaron | 181/102 |

*Primary Examiner*—Nelson Moskowitz
*Attorney, Agent, or Firm*—Albert M. Crowder, Jr.

[57] ABSTRACT

A well logging instrument is attached at its first end to a well logging cable and is connected at its second end through a flex joint to a shaft section which through another flex joint is connected at its lower end to a centralizing section. As the well logging instrument traverses an earth borehole, the lower centralizer section maintains the guide nose of the centralizer section away from the ledges encountered along the borehole walls and a shaft flexibly connected between the well logging instrument and the centralizer section ties the gravity decentralized logging instrument to the lower centralizing section and steers the lower guide nose away from the ledges which are encountered.

1 Claim, 4 Drawing Figures

WELL LOGGING INSTRUMENT GUIDE APPARATUS

BACKGROUND OF THE INVENTION

This invention relates generally to an apparatus for logging earth boreholes and specifically to an apparatus which utilizes means to assist a well logging instrument to traverse highly deviated earth boreholes.

It has become relatively common within the last few years to drill wells in the search for oil and gas and the like with a portion of the well bore deviating from the usual vertical orientation thereof. The deviation or inclination may extend for a considerable distance at angles ranging to 70°, sometimes returning to the usual vertical orientation.

It is also well known in the art of drilling such wells to attempt the logging of the formations surrounding such boreholes with logging instrument run into the well bore on a wireline and/or a cable to perform various operations. Such tools usually depend upon the force of gravity to permit positioning of the well tool at the desired location in the well bore.

Another problem associated with such boreholes relates to the instability of some formations penetrated by the well bore, thus causing borehole diameter changes, some very abrupt. Ledges are formed, and the logging instrument frequently will lodge against them.

It is therefore the primary object of the present invention to provide a new and improved apparatus for logging earth boreholes, especially those boreholes having abrupt ledges therein.

The objects of the invention are accomplished, generally, by an apparatus comprising an elongated well logging instrument having first and second ends, an elongated shaft having first and second ends and a centralizer section having first and second ends, the first end of said instrument being adapted to be connected to a well logging cable, the second end of said instrument being connected to the first end of said shaft by a first flex joint and the first end of said centralizer section being connected to the second end of said shaft by a second flex joint. In an alternative embodiment, a plurality of such shafts are flexibly connected between the well logging instrument and the centralizer section.

Figure 2:
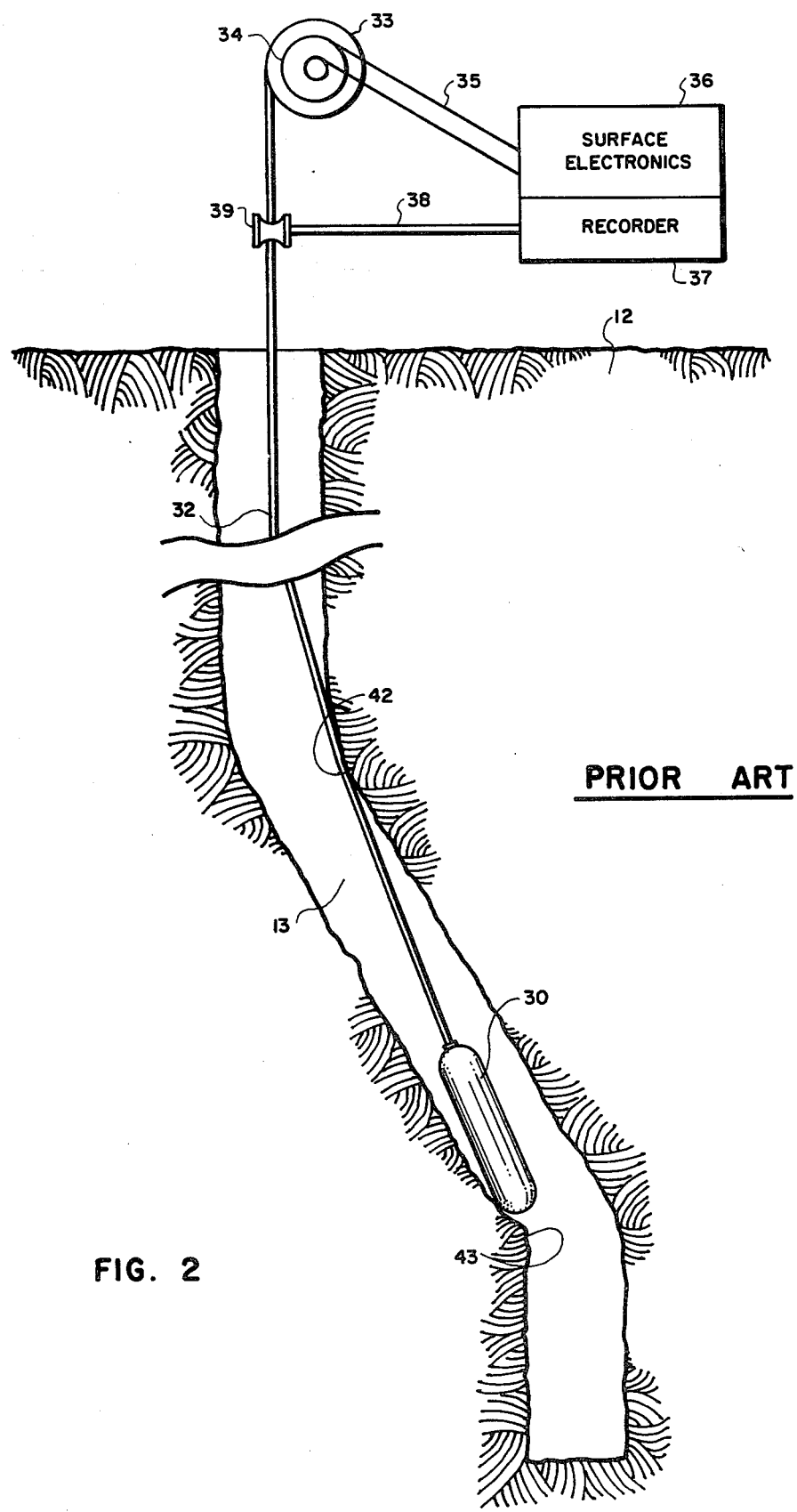
Figure 3:
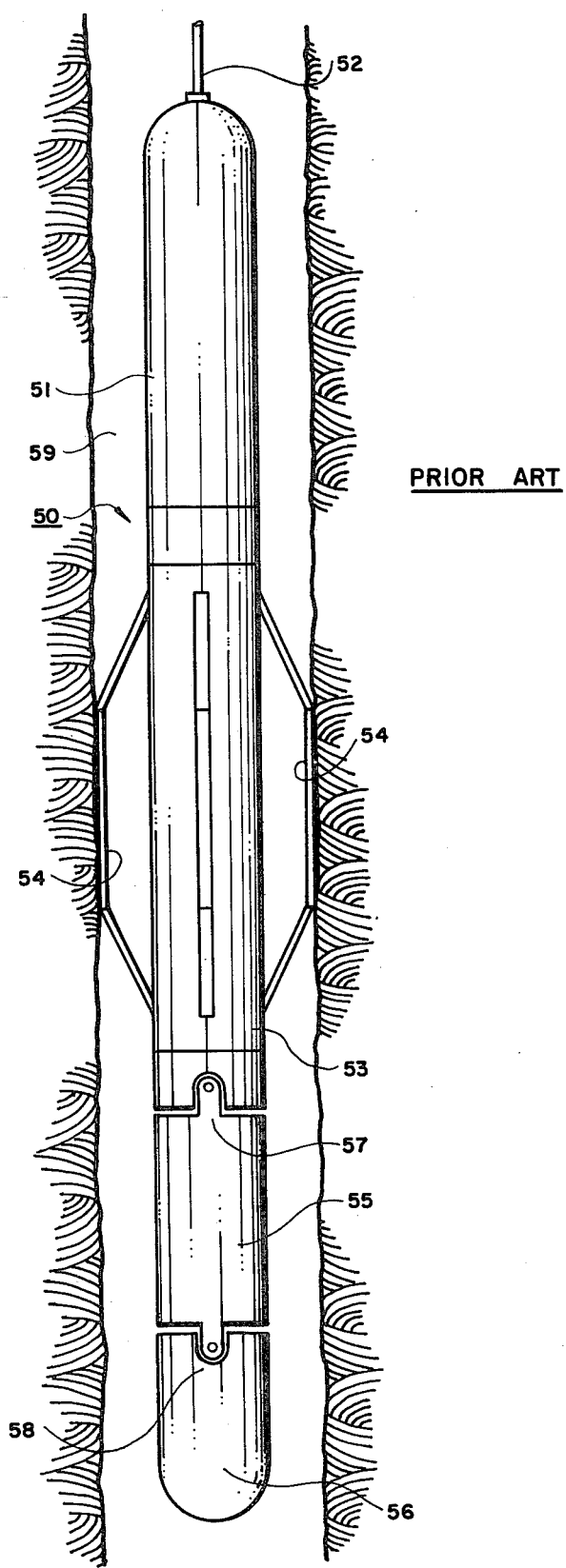
Figure 4:
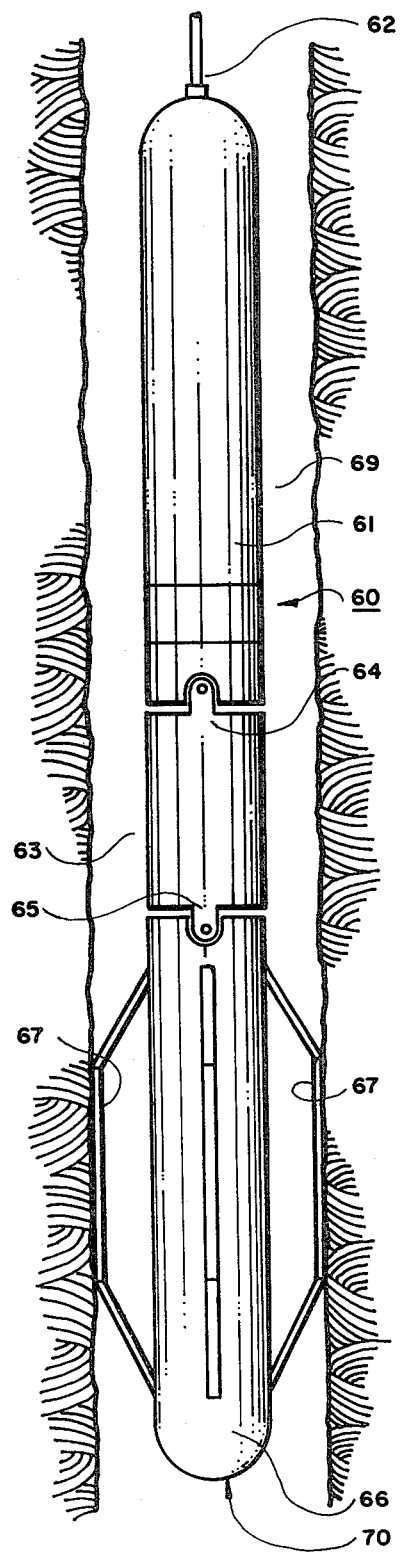

These and other objects, features and advantages of the present invention will be apparent from the following detailed description taken with reference to the figures of the accompanying drawing, wherein:

FIG. 1 is a schematic view illustrating the drilling of a deviated earth borehole from an offshore platform;

FIG. 2 schematically illustrates a prior art well logging system encountering some of the problems associated with logging a highly deviated earth borehole;

FIG. 3 schematically illustrates a prior art well logging system which has been used in an attempt to overcome some of the problems as graphically illustrated in FIG. 2; and FIG. 4 is an elevated view, partly in cross section, of the apparatus according to the present invention for logging an earth borehole.

Referring now to the drawing in more detail, especially to FIG. 1, there is illustrated schematically a conventional system for drilling an earth borehole having a high degree of deviation from true vertical. As is well known in the art, it is common practice to drill such slanted wells from offshore platforms. A drilling platform 10 having a plurality of legs 11 anchored on the ocean floor 12 has an earth borehole 13 drilled therefrom. Within the borehole 13 is a pipe string 14, to the lower end of which is attached a drill bit 15. A surface casing 25 maintains the integrity of the borehole 13 as is well known in the art. A derrick 16 with its conventional drawworks 17 is mounted on the platform 10. The drill string 14 comprises a number of joined sections of pipe terminating at its upper end in a kelly 18, followed by a swivel 19, a hook 20 and a traveling block 21 suspended by a drilling line 22 from a crown block 23. The drawworks 17 also drive a rotary table 24 which in turn transmits the drive to the kelly 18. One end of the line 22, namely the fast line 22a, is connected to the drawworks 17 which contains the motor or motors for manipulating the drill string. Although not illustrated, the other end of the drill line 22 is secured to an anchor on the platform floor, that portion of the line extending to the anchor from the crown block being generally referred to as the dead line. Again not illustrated, such an anchor member normally would include a winding-on drum and can also, if desired, contain a dead line sensor for monitoring the weight on the bit, for example, as shown in U.S. Pat. No. 3,461,978 to F. Whittle, issued Aug. 19, 1969.

In the operation of the system according to FIG. 1, it is quite conventional in drilling wells from such offshore platforms to drill the initial portion of the well substantially along a vertical line from the platform and then to angle off in the further drilling of the well. Such wells after angling off will oftentimes be inclined at an angle of 60° to 70° from vertical. It is with these types of highly deviated wells that the problem presents itself as to providing a log of the formations surrounding the well bore.

Referring now to FIG. 2, there is illustrated schematically a well logging operation conducted in accordance with the prior art in which a portion of the earth's surface 12 is shown in vertical section. A well 13, which has been drilled as illustrated in FIG. 1, penetrates the earth's surface. Disposed within the well is subsurface instrument 30 of the well logging system. The subsurface instrument 30 may be of any conventional type, for example, one which is adapted to conduct an induction, electric, acoustic, or any other of the conventional logs well known in the art. It should be appreciated, moreover, that the particular type of well logging instrument 30 forms no part of the present invention.

Cable 32 suspends the instrument 30 in the well and contains the required conductors for electrically connecting the instrument 30 with the surface electronics. The cable is wound on or unwound from drum 33 in raising and lowering the instrument 30 to traverse the well. During the traversal, the signals from the well logging instrument 30 are sent up the cable 32. Through slip rings and brushes 34 on the end of the drum 33, the signals are conducted by the lines 35 to the surface electronics 36. A recorder 37 connected to the surface electronics 36 is driven through the transmission 38 by the measuring reel 39 over which the cable 32 is drawn, so that the recorder 37 associated with the surface electronics 36 moves in correlation with depth as instrument 30 traverses the well. It is also to be understood that instruments such as the instrument 30 are generally constructed to withstand the pressures and mechanical and thermal abuses encountered in logging a deep well.

In the operation of the system illustrated in FIG. 2, the cable 32 is touching one ledge of the formation at the point 42 and the instrument 30 has come to rest against another such ledge at the point 43, the ledge 43 making it exceedingly difficult, if not impossible, for the instrument 30 to traverse the earth borehole merely by its own weight due to the force of gravity.

Referring now to FIG. 3, there is schematically illustrated a well logging apparatus 50 which has been used by those in the prior art in an attempt to traverse highly deviated earth boreholes. The prior art apparatus 50 includes the well log instrumentation section 51 which may be of any conventional type, for example, an acoustic, induction, or other of the well logging devices well known in the art. The apparatus 50 is suspended by a well logging cable 52 within the borehole 59 in a manner similar to that illustrated in FIG. 2. The apparatus 50 also includes a centralizer section 53 having a plurality of springs or other arm members 54 which engage the borehole walls but yet are designed to have low coefficients of friction. Attached to the end of the centralizer section 53 opposite the end which is attached to the well logging instrumentation section 51 is a series of one or more tubular members 55 and 56 which are coupled together by flexible joints, for example, U-joints 57 and 58 respectively.

In the operation of the prior art apparatus of FIG. 3, as the apparatus 50 is lowered into the earth borehole 59 by means of the well logging cable 52, the centralizing section 53 is utilized in the conventional manner to keep the instrument 51 centralized within the earth borehole and the members 55 and 56, by means of the flexible joints 57 and 58, attempt to snake their way along the interior of the earth borehole 59 and hopefully past any ledges or abrupt changes in the formation walls.

Referring now to FIG. 4, there is illustrated the apparatus in accordance with the present invention which is believed to be a vast improvement over the prior art apparatus illustrated in FIG. 3. The well logging apparatus 60 contains a conventional well logging instrument section 61 at its upper end and is suspended by a well logging cable 62 in the earth borehole 69 in a manner similar to that illustrated in FIG. 2. Adjacent the well logging instrumentation section 61 is a shaft 63 having flexible joints at its two ends, the flex joint 64 providing a flexible connection to the well logging instrumentation 61 and the flex joint 65 providing a flexible connection to the centralizer section 66. The centralizer section 66 is at the lower end of the apparatus 60 and contains a plurality of springs or other arm members 67 which maintain the section 66 centralized within the borehole 69. The arms 67 are engineered to be lightweight and have a low coefficient of friction. It should also be appreciated that the flex joints 64 and 65 are preferably U-joints.

In the operation of the apparatus of FIG. 4, as the well logging instrument 60 traverses the earth borehole 69 by the action of the well logging cable 62 allowing the apparatus to descend within the borehole, the lower centralizer section 66 maintains the guide nose 70 of section 66 away from most of the ledges which might be encountered along the borehole wall. The shaft 63 ties the gravity decentralized logging instrument section 61 to the lower centralizing section 66 and steers the lower guide nose 70 away from the ledges. By means well known in the art, the lower centralizer section 66 collapses to some three or four inches O.D. and can expand out to 15 or 16 inches O.D. Examples of such conventional means for collapsing the arms of centralizer section 66 are illustrated and described in U.S. Pat. No. 3,978,924 which issued on Sept. 7, 1976 to Raymond D. Roesner, and U.S. Pat. No. 3,977,468 which issued on Aug. 31, 1976 to James E. Brewer and Raymond E. Roesner, both of such patents being assigned to the assignee of the present invention.

Thus it should be appreciated that there has been illustrated and described herein the preferred embodiment of the present invention which finds utility in facilitating the movement of a well logging apparatus through a highly deviated earth borehole. However, those skilled in the art will recognize that obvious modifications can be made to the preferred embodiment without departing from the spirit of the invention. For example, instead of having a single shaft 63, two or more such shafts, joined together by flex joints, can be utilized between the well logging instrument section and the centralizer section.

The embodiments of the invention in which an exclusive property or privilege is claimed are defined as follows:

1. An apparatus for logging the formations surrounding a highly deviated earth borehole, comprising:
   an elongated well logging instrument having first and second ends and adapted to traverse an earth borehole, said first end of said instrument adapted to be connected to a well logging cable and said second end of said instrument having a first flexible U-joint connector;
   an elongated centralizer member having first and second ends and having a plurality of arm members adapted to movingly engage the walls of said earth borehole, said first end of said centralizer member having a second flexible U-joint connector with said second end of said centralizer member, being substantially rounded; and
   at least one elongated shaft member having opposing ends flexibly connected between said first flexible U-joint connection of said well logging instrument and said second flexible U-joint connection of said centralizer member thereby causing said logging instrument to maintain a decentralized position in relation to said centralizer member within said highly deviated borehole.

* * * * *